United States Patent [19]

Frazza et al.

[11] Patent Number: 5,035,944

[45] Date of Patent: Jul. 30, 1991

[54] METHOD FOR TREATING SUBSTRATES

[75] Inventors: Mark S. Frazza, Philadelphia; Linda S. Smith, Oreland, both of Pa.

[73] Assignee: Rohm and Haas Company, Philadelphia, Pa.

[21] Appl. No.: 435,850

[22] Filed: Nov. 13, 1989

[51] Int. Cl.$^5$ ............................................. B32B 3/26
[52] U.S. Cl. .............................. 428/312.4; 428/311.7; 428/327; 428/703
[58] Field of Search ................. 427/385.5, 393, 393.6; 428/540, 541, 311.7, 312.4, 327, 703

[56] References Cited

FOREIGN PATENT DOCUMENTS 332011 9/1989 European Pat. Off. .

OTHER PUBLICATIONS

H. D. Christian, "Polymethacrylate Dispersions for Wood Prevservation . . . ", J. Oil Col. Chem. Assn., vol. 72, pp. 442–446 (1989).
H. D. Christian, "Polymethacrylat-Dispersmon für den Holzschultz", Materialen, Feb. 1989, No. 2, pp. 21–26 (1989).
Product Data Sheet, Degussa AG, "Degalex® VP-EM 174", dated Sep. 1989.
Product Data Sheet, Degussa AG, "Degalex VP-BF150", dated Sep. 1989.

*Primary Examiner*—Michael Lusignan

[57] ABSTRACT

A method for treating substrates with an aqueous composition is provided. The aqueous composition contains an aqueous dispersion of copolymer particles which have at least two mutually incompatible phases and where the particles have an average particle size of from about 20 to about 70 nanometers.

6 Claims, No Drawings

METHOD FOR TREATING SUBSTRATES

FIELD OF THE INVENTION

This invention relates to a method for treating substrates with an aqueous composition which contains an aqueous dispersion of copolymer particles which have at least two mutually incompatible phases and where the particles have an average particle size of from about 20 to about 70 nanometers.

BACKGROUND OF THE INVENTION

It is desirable to treat substrates with aqueous compositions so that the treated substrates attain their final properties rapidly so that they can be handled and used without undue delay. At the same time, aqueous coatings are also advantageous for application to temperature sensitive substrates such as, for example, paper or plastics, or to large substrates such as, for example, concrete floors, because they dry rapidly and quickly develop the intended useful properties at ambient or only moderately elevated temperatures. The treatment of certain types of substrates such as, for example, wood, frequently requires coatings with a high level of transparency and clarity to minimize the intrusive aesthetic aspects of the coating. The method for treating substrates of this invention provides treatments which develop the intended properties rapidly and exhibit excellent transparency or clarity.

DESCRIPTION OF THE PRIOR ART

U.S. Pat. No. 3,244,655 discloses a process for preparing an interpolymer latex by the sequential polymerization of two stages in an aqueous emulsion polymerization to yield interpolymer particles which form clear, colorless, glossy films upon normal air drying. Also disclosed are sequentially polymerized dispersions which may be compounded with pigments to produce a paint whose air-dried film is glossy, tack-free flexible and enamel-like, retains its gloss and is highly resistant to water spotting. Further disclosed is a sequentially polymerized latex with a particle size which was uniform at about 100 nanometers.

U.S. Pat. No. 4,325,856 discloses a process for the preparation of stable aqueous synthetic copolymer latexes which comprises (A) first preparing an initial aqueous latex of a substantially linear hydrophilic polymer by emulsion polymerizing at a pH of from about 2 to about 6 an initial monomer charge containing (1) one or more vinyl esters of a non-addition polymerizable carboxylic acid and/or one or more esters of an addition polymerizable carboxylic acid and (2) a relatively hydrophilic copolymerizable comonomer in an amount sufficient to render the copolymer of the initial latex sufficiently hydrophilic that it ultimately becomes preferentially oriented toward the outer surface of the finished copolymer particles; and (B) thereafter emulsion polymerizing, in the presence of from about 5 to about 50 parts by weight on a polymer solids basis of the initial hydrophilic polymer latex of step A and at a pH of from about 2 to about 6, from about 50 to about 95 parts by weight of a second monomer charge comprising (1) an aliphatic conjugated diene and/or an addition polymerizable monovinylidene monomer selected from the group consisting of monovinylidene aromatic monomer and vinylidene halide monomers and (2) from 0 to about 10 weight based upon the weight of such second monomer charge of a monoethylenically unsaturated carboxylic acid monomer. Disclosed are dispersed polymer particles with an average diameter of from about 80 to about 500 nanometers. Exemplified are finished copolymer particles with an average particle size of 103 to 188 nanometers. Also disclosed is the use of the resulting two stage latexes in coating formulations such as, for example, paints or pigmented paper coating compositions; in adhesive compositions; and as impregnants and the like.

Mondt (J. L. Mondt, J. Oil Col. Chem. Assoc., Vol. 60, pages 398–403 (1977)) discloses aqueous acrylic emulsions with particle sizes less than 50 nanometers; the emulsions were all made by single stage polymerization techniques and were used for priming and impregnating porous substrates.

Funke (W. Funke, Proceedings of the International Conference in Organic Coatings Science and Technology (Athens), pages 339–350 (1980)) discloses unsaturated polyester microemulsions with number average particle sizes of 54.3 to about 100 nanometers. Funke discloses use of these single stage emulsions in organic coatings.

U.S. Pat. No. 4,654,397 discloses multi-stage emulsion polymerization of predominant amounts of monoolefinically unsaturated monomers A, whose homopolymers have a glass transition temperature of from 0° C. to −72° C., with monoolefinically unsaturated monomers B, whose homopolymers have a glass transition temperature from 80° C. to 140° C., from 0.2 to 6% by weight, based on the total amount of monomers, of monoolefinically unsaturated monomers C which possess carboxyl and/or carboxamide groups, and from 0 to 10% by weight, based on the total amount of monomers, of olefinically unsaturated monomers D which effect crosslinking, by a certain process, so that the resulting aqueous polymer dispersion has a polymer content of from 40 to 60% by weight, based on the polymer dispersion, and a content of anionic emulsifiers of from 0.5 to 3% by weight, based on the polymer, and, when the polymer contains D as copolymerized units, a hydrazide of an aliphatic dicarboxylic acid is added to the ready-prepared polymer dispersion in an amount of from 0.5 to 1 mole per mole of carbonyl monomer. Further disclosed is the use of these multi-stage polymer dispersions as binders for coating materials and in particular glazes. The glazes prepared using the disclosed polymer dispersions permit rapid coating of wood, for example window frames, which can be stored virtually directly after drying without there being any danger of blocking, provided that the coatings are cooled to room temperature. The reference does not teach or suggest the benefits of a particular particle size range.

Muramoto (H. Muramoto, et al., Proceeding XIIIth International Conference in Organic Coatings Science Technology, pages 237–249 (1987)) discloses core-shell microgels prepared by emulsion polymerization. The microgels are composed of a crosslinked polymer core with a core particle size of 30 to 50 nanometers and a grafted linear polymer shell. Muramoto also discloses the use of such microgels in organic solvent-containing coatings systems such as metallic flake basecoat-clearcoat systems. Muramoto does not disclose the use of core-shell particles in aqueous treating compositions.

None of the references teach a method for treating substrates with an aqueous composition containing an aqueous dispersion of copolymer particles which have at least two mutually incompatible phases and where the particles have an average particle size of from about 20 to about 70 nanometers.

It is an object of this invention to provide a method for treating substrates.

It is an object of this invention to provide a method whereby an aqueous composition which dries quickly to a glossy, clear, non-blocking film is applied to a substrate.

It is a further object of this invention to provide a method for coating wood whereby a clear, print resistant coating with appearance superior to that of prior art coatings is obtained.

SUMMARY OF THE INVENTION

A method of applying an aqueous treating composition, containing an aqueous dispersion of copolymer particles of at least two mutually incompatible phases and an average particle size of from about 20 to about 70 nanometers, to a substrate.

DETAILED DESCRIPTION OF THE INVENTION

This invention is directed to the application of an aqueous treating composition to a substrate. The aqueous treating composition contains an aqueous dispersion of copolymer particles. The particles contain at least two mutually incompatible copolymers. The particles have an average particle size of from about 20 to about 70 nanometers.

The aqueous dispersion is prepared by emulsion polymerization techniques. Ethylenically unsaturated monomers may be used to prepare the latex polymers used in the treating composition of this invention. For example, acrylic ester monomers including methyl acrylate, ethyl acrylate, butyl acrylate, 2-ethylhexyl acrylate, decyl acrylate, methyl methacrylate, ethyl methacrylate, butyl methacrylate, i-butyl methacrylate, i-bornyl methacrylate; styrene, substituted styrenes, butadiene, acrylonitrile, vinyl acetate, and the like may be used. Additionally, functional monomers such as, for example, acrylic acid, methacrylic acid, itaconic acid, maleic acid fumaric acid, hydroxyethyl methacrylate, hydroxypropyl methacrylate, N,N-dimethylaminoethyl methacrylate may be used. Additionally, crosslinking and graftlinking monomers such as 1,4-butyleneglycol methacrylate, trimethylolpropane triacrylate, allyl methacrylate, diallyl phthalate, divinyl benzene, and the like may be used.

The aqueous dispersion contains copolymer particles made up of at least two mutually incompatible copolymers. These mutually incompatible copolymers may be present in the following morphological configurations, for example, core/shell, core/shell particles with shell phases incompletely encapsulating the core, core/shell particles with a multiplicity of cores, interpenetrating network particles, and the like. In all of these cases the majority of the surface area of the particle will be occupied by at least one outer phase and the interior of the particle will be occupied by at least one inner phase.

The mutual incompatibility of two polymer compositions may be determined in various ways known in the art. The use of scanning electron microscopy using staining techniques to emphasize the difference between the appearance of the phases, for example, is such a technique.

The emulsion polymerization techniques used to prepare such dispersions are well known in the art. For example, sequential emulsion polymerization processes which are believed to yield core/shell particles, are taught in U.S. Pat. Nos. 4,325,856 and 4,654,397, which are hereby incorporated herein by reference. Other modified latex polymer compositions which are believed to contain particles incorporating multiple incompatible polymeric phases are taught in U.S. Pat. No. 4,814,373, which is hereby incorporated herein by reference.

It is preferred that the mutually incompatible copolymers are selected so that the glass transition temperature(Tg) of at least one outer phase such as, for example, a shell phase is lower than the Tg of at least one inner phase such as, for example, a core phase. It is more preferred that the mutually incompatible copolymers are selected so that the glass transition temperature(Tg) of at least one outer phase is lower than about 35° C. and that at least one inner phase has a Tg of at least about 45° C. Most preferred is at least one inner phase with a Tg of at least 60° C.

The weight of the outer, lower Tg, phase, based on the total weight of the particle comprising at least two mutually incompatible copolymers, is from about 20% to about 95%. It is preferred that the weight of the outer phase, based on the total weight of the particle, is from about 30% to about 75%.

Chain transfer agents including mercaptans, polymercaptans, and halogen compounds are sometimes desirable in the polymerization mixture in order to moderate the molecular weight of the latex polymer. Generally, from about 0% to about 3%, by weight of chain transfer agent, based on the weight of the total monomer mixture, may be used. The weight average molecular weight of the outer phase is from about 50,000 to about 10,000,000. The weight average molecular weight of the inner phase is from about 1,000,000 to about 10,000,000. Preferred is a weight average molecular weight of the outer phase of from about 500,000 to about 10,000,000.

The particles of this invention must have particle sizes in the range of from about 20 to about 70 nanometers. This particle size range is lower than for typical emulsion polymers but is readily accomplished by using higher than usual levels of polymerization surfactant. Anionic or nonionic surfactant, or mixtures thereof, may be used. Preferred is the use of from about 2% to about 8% of anionic surfactant based on the weight of the total monomer mixture.

Particle sizes greater than about 70 nanometers do not yield treatments which possess the appearance properties of the treatments of this invention, particularly in clarity and distinctness of image of clear and flatted sealers and coatings. Particle sizes lower than about 20 nanometers are difficult to prepare by conventional techniques and exhibit a high viscosity which may necessitate application of the treatment at lower than desired solids content.

The particle size of the particles of this invention is measured using a Brookhaven BI-90 Particle Sizer which employs a light scattering technique. To measure the particle size a sample of 0.1 to 0.2 grams of neat, as is, aqueous dispersion is diluted to a total of 40 cc. with distilled water. A 2 cc. portion is delivered into an acrylic cell which is then capped. The particle size is then measured for 1000 cycles. The measurement is repeated two additional times and the average of the three values is taken as the particle size herein.

In addition, conventional coatings components such as, for example, pigments, colorants, dispersants, surfactants, coalescents, wetting agents, rheology modifiers, thickeners, biocides, anti-foaming agents, waxes, and the like may be used in the method of this invention. When pigments such as, for example, silica are used as flatting agents, the optimum flatting effect with minimum loss of clarity of the applied film is achieved when the refractive index of the polymeric components is equal to that of the flatting pigment.

The substrates treated by the method of this invention may include, for example, wood, glass, plastics, metals, cementitious surfaces, and the like. The substrates may have been previously impregnated, primed, sealed, colored, coated, painted, or the like. The treatment may be applied by conventional techniques such as, for example, by brush, roller, air-assisted spray, airless spray, dip coater, flow coater, roller coater, saturation bath, and the like.

The following examples are intended to illustrate the method of treating substrates, to which this invention is directed. They are not intended to limit the invention as other applications of the invention will be obvious to those of ordinary skill in the art.

EXAMPLE 1

Preparation of Aqueous Copolymer Dispersion

Preparation of Sample 1

To a 5 gallon stirred reactor 6905.7 g. deionized water (DI water) and 573.3 g of an aqueous solution of anionic surfactant(23% active ingredient) which had been heated to 88° C. was added 233.1 g. of Monomer Emulsion #1 (ME #1) which was then rinsed into the reactor with 108.0 g. of DI water. A solution of 11.25 g. of ammonium persulfate in 189.0 g. DI water and a solution of 11.25 g. sodium carbonate in 140.4 g. DI water were added. The temperature which had fallen to 85° C. with the above additions rose to 86° C. with the reaction exotherm. Twelve minutes after the first addition, the temperature was 84° C. and the uniform addition of the remainder of ME #1 and a solution of 11.25 g. ammonium persulfate in 1125.0 g. DI water were begun. The temperature varied from 82° C. to 86.5° C. over the 88 minute period during which ME #1 was added. Thirty minutes later, the temperature was 85° C. and the addition of Monomer Emulsion #2 (ME #2) was begun. The temperature varied from 84° to 86.5° C. during the 95 minute period over which ME #2 was added. The final reaction mixture was neutralized to pH=7.1 with 28% aqueous ammonia. The final latex had a Brookfield viscosity of 600 cps. at a weight % solids content of 38.8% and a particle size of 68 nanometers. The two polymer stages are mutually incompatible.

TABLE 1.1

| Monomer Emulsion #1 | |
| --- | --- |
| DI water | 1125. g. |
| Anionic Surfactant (23% active) | 47.7 g. |
| 2-Ethylhexyl acrylate | 2360.7 g. |
| Styrene | 298.8 g. |
| Acrylonitrile | 936.0 g. |
| Methacrylic acid | 150.3 g. |

TABLE 1.2

| Monomer Emulsion #2 | |
| --- | --- |
| DI water | 1125. g. |
| Anionic Surfactant | 47.7 g. |
| 2-Ethylhexyl acrylate | 224.1 g. |
| Methyl methacrylate | 3446.0 g. |

TABLE 1.2-continued

| Monomer Emulsion #2 | |
| --- | --- |
| Methacrylic acid | 75.0 g. |

EXAMPLE 2

Preparation of Comparative Aqueous Dispersion

Preparation of Comparative A

This dispersion has the identical overall composition to Sample 1 except that the process used a single combined monomer emulsion feed. As a result, there is only one polymer phase. The particle size of the latex was measured to be 49 nanometers.

EXAMPLE 3

Preparation of Comparative Aqueous Dispersion

Preparation of Comparative Sample B

This dispersion was prepared according to the method of Example 1 with different monomer emulsion compositions, as noted below, and 160 g. of an aqueous solution of anionic surfactant(23% active) in the reactor charge.

The resultant latex had a pH=7.1, a Brookfield viscosity of 740 centipoises, and a particle size of 90 nanometers. The two copolymers produced are mutually incompatible; however, this is a comparative sample as the particle size is outside the range of this invention.

TABLE 3.1

| Monomer Emulsion #1 | |
| --- | --- |
| DI water | 1200. g. |
| Anionic Surfactant (23% active) | 95. g. |
| 2-Ethylhexyl acrylate | 2520. g. |
| Styrene | 320. g. |
| Acrylonitrile | 1000. g. |
| Methacrylic acid | 160. g. |

TABLE 3.2

| Monomer Emulsion #2 | |
| --- | --- |
| DI water | 1200. g. |
| Anionic Surfactant (23% active) | 95. g. |
| i-Butyl nethacrylate | 1600. g. |
| Methyl methacrylate | 2320. g. |
| Methacrylic acid | 80. g. |

EXAMPLE 4

Preparation of comparative aqueous dispersion

Preparation of comparative sample C

This sample was prepared identically to comparative sample B, including the use of exactly the same monomer emulsions. The resultant dispersion had pH=7.1, Brookfield viscosity of 640 centipoises, and a particle size of 94 nanometers.

EXAMPLE 5

Preparation of aqueous copolymer dispersion.

Preparation of Sample 2

To a 5 gallon stirred reactor 8569.7 g. deionized water (DI water) and 531.2 g. of an aqueous solution of anionic surfactant(23% active ingredient) which had been heated to 86° C. was added 216.7 g. of Monomer Emulsion #1 (ME #1) which was then rinsed into the reactor with 43.3 g. of DI water. A solution of 10.4 g of ammonium persulfate in 173.5 g. DI water and a solution of 10.4 g. sodium carbonate 130.1 g. DI water were added. The temperature fell to 82° C. with the above additions. Thirteen minutes after the first addition, the temperature was 82° C. and the uniform addition of the remainder of ME #1 and a solution of 10.4 g. ammonium persulfate in 1040.8 g. DI water were begun. The temperature varied from 81° to 85° C. over the 78 minute period during which ME #1 was added. Thirty minutes later, the temperature was 85° C. and the addition of Monomer Emulsion #2 (ME #2) was begun and the addition of the ammonium persulfate solution was resumed. The temperature varied from 83.5° C. to 85° C. during the 100 minute period over which ME #2 was added. The final reaction mixture was neutralized to pH=7.25 with 28% aqueous ammonia. The final latex had a Brookfield viscosity of 55 cps. at a weight % solids content of 34.9% and a particle size of 63 nanometers. The two copolymers produced are mutually incompatible.

TABLE 5.1

| Monomer Emulsion #1 | |
|---|---|
| DI water | 1040.8 g. |
| Anionic Surfactant (23% active) | 44.2 g. |
| 2-Ethylhexyl acrylate | 2185.7 g. |
| Styrene | 277.6 g. |
| Acrylonitrile | 867.3 g. |
| Methacrylic acid | 138.7 g. |

TABLE 5.2

| Monomer Emulsion #2 | |
|---|---|
| DI water | 1040.8 g. |
| Anionic Surfactant (23% active) | 44.2 g. |
| i-Butyl Methacrylate | 1387.7 g. |
| Methyl methacrylate | 2012.2 g. |
| Methacrylic acid | 69.4 g. |

EXAMPLE 6

Preparation of aqueous copolymer dispersion

Preparation of Sample 3

To a 3 liter stirred reactor 1205.7 g. deionized water(DI water) and 43.6 g of an aqueous solution of anionic surfactant(23% active ingredient) which had been heated to 85° C. was added a part of Monomer Emulsion #1 (ME #1). A solution of 1.04 g. of ammonium persulfate in 17. g. DI water was added one minute later. Ten minutes after the first addition, the temperature was 85° C. and the uniform addition of the remainder of ME #1 ME #1 and a solution of 1.04 g. ammonium persulfate in 104.1 g. DI water were begun. The temperature was constant at 85° C. over the 80 minute period during which ME #1 was added. A ME #1 rinse of 21.6 g. DI water was added to the kettle. The stirring was stopped for 15 minutes and then resumed for 20 additional minutes. At this point, the temperature was 85° C.; the addition of Monomer Emulsion #2 (ME #2) was begun and the addition of the ammonium persulfate solution was resumed. The temperature was held at 85° C. during the 80 minute period over which ME #2 was added. The ME #2 was rinsed into the kettle with 21.6 g. DI water. Solutions of 0.85 g. t-butyl hydroperoxide in 4.30 g. DI water, 0.52 g. sodium sulfoxylate formaldehyde in 13 g. DI water, and 3 g. of a 0.15% solution of ferrous sulfate heptahydrate. The final reaction mixture was neutralized to pH=7.4 with 28% aqueous ammonia. The final latex had a Brookfield viscosity of 22 cps. at a weight % solids content of 29.8% and a particle size of 43 nanometers. The two copolymers produced were mutually incompatible.

TABLE 6.1

| Monomer Emulsion #1 | |
|---|---|
| DI water | 114.3 g. |
| Anionic Surfactant (23% active) | 3.6 g. |
| 2-Ethylhexyl acrylate | 218.6 g. |
| Ethyl acrylate | 5.8 g. |
| Methyl methacrylate | 5.2 g. |
| Styrene | 27.7 g. |
| Acrylonitrile | 86.7 g. |
| Methacrylic acid | 14.0 g. |

TABLE 5.2

| Monomer Emulsion #2 | |
|---|---|
| DI water | 104.3 g. |
| Anionic Surfactant (23% active) | 3.6 g. |
| i-Butyl Methacrylate | 138.8 g. |
| Methyl methacrylate | 201.2 g. |
| Methacrylic acid | 6.9 g. |

EXAMPLE 7

Treatment of substrates

The following formulations incorporated Sample 1 and Comparative A and were prepared by adding the following ingredients in the order listed, with stirring. All quantities listed are in grams.

TABLE 7.1

| Formulations for Example 7 | | | | |
|---|---|---|---|---|
| | Sample | | | |
| | 7.1 Sample 1 | 7.2 Comparative A | 7.3 Sample 1 | 7.4 Comparative A |
| Latex. | 80.77 | 80.0 | 80.0 | 61.56 |
| Defoamer ® (PATCOTE 519) | | 0.15 | 0.15 | 0.12 |
| Butyl CARBITOL ® | 6.30 | 6.06 | 3.10 | 2.33 |
| Hexyl CELLOSOLVE | | | 4.66 | 3.50 |
| PROPASOL ® B | 3.15 | 3.03 | | |
| NH4OH(14%) | 0.34 | 0.26 | 0.30 | 0.11 |
| pH | 8.37 | | 8.03 | |
| water | 4.31 | | 7.76 | 5.83 |

Treatments were prepared at a dry film thickness of approximately 25 microns by casting Samples 7.1–7.4 on glass plates. The films were dried at a constant 72 F./50% relative humidity. Hardness was measured in Knoop Hardness Numbers(KHN) using a Tukon Hardness Tester.

TABLE 7.2

| Data for hardness development (KHN vs. drying time) | | | | |
|---|---|---|---|---|
| | Sample | | | |
| Time | 7.1 | 7.2 | 7.3 | 7.4 |
| 5 hrs. | 0.77 | 0.39 | 0.73 | 0.29 |
| 25 hrs. | 3.22 | 1.00 | 3.81 | 1.60 |
| 26 hrs. | 3.25 | 1.15 | 3.82 | 1.62 |
| 28 hrs. | 3.25 | 1.03 | 3.93 | 1.61 |
| 30 hrs. | 3.26 | 1.05 | 3.97 | 1.76 |
| 48 hrs. | 3.48 | 1.44 | 4.55 | 2.20 |
| 72 hrs. | 3.66 | 1.88 | 4.90 | 2.66 |
| 96 hrs. | 4.96 | 2.98 | 5.39 | 3.22 |
| 168 hrs. | 540 | 4.50 | 5.65 | 4.75 |
| final | 5.53 | 6.31 | 5.68 | 6.46 | final = 7 days ambient + 2 hrs. at 140° F.

The rate of hardness development of the films applied according the method of this invention (Samples 7.1 and 7.3) was much greater than that of comparative dispersion A in the same formulations. The rate of hardness development is related to the time in which coated articles may be handled or used without damage to the coated film.

EXAMPLE 8

Clarity of high gloss and flatted treatments

The following formulations incorporated Sample 2 and Comparative B and were prepared by adding the following ingredients in the order listed, with stirring, with the exception that, when silica was used, the silica was slurried into a mixture of the Butyl CARBITOL ® and the PROPASOL ® B, and the slurry added to the latex. All quantities listed are in grams.

TABLE 8.1

Formulations for Example 8

| | Sample | | | |
|---|---|---|---|---|
| | 8.1 Sample 2 | 8.2 Sample 2 | 8.3 Sample 2 | 8.4 Sample 2 |
| Latex. | 90.0 | 90.0 | 90.0 | 90.0 |
| Butyl CARBITOL ® | 6.30 | 6.30 | 6.30 | 6.30 |
| PROPASOL ® B | 3.15 | 3.15 | 3.15 | 3.15 |
| silica (SYLOID TS-100) | — | 0.32 | 0.95 | 1.58 |
| NH4OH(14%) | 0.22 | 0.48 | 0.38 | 0.26 |
| pH | 8.16 | 8.80 | 8.25 | 8.21 |
| water | — | 0.72 | 2.14 | 3.56 |
| viscosity (centipoises) | 180 | 200 | 180 | 180 |

| | Sample | | | |
|---|---|---|---|---|
| | 8.5 Comp. B | 8.6 Comp. B | 8.7 Comp. B | 8.8 Comp. B |
| Latex. | 77.78 | 77.78 | 77.78 | 77.78 |
| Butyl CARBITOL ® | 6.30 | 6.30 | 6.30 | 6.30 |
| PROPASOL ® B | 3.15 | 3.15 | 3.15 | 3.15 |
| silica (SYLOID TS-100) | — | 0.32 | 0.95 | 1.58 |
| NH4OH(14%) | 0.30 | 0.27 | 0.23 | 0.24 |
| pH | 8.14 | 8.30 | 8.09 | 8.04 |
| water | 7.40 | 7.89 | 9.52 | 12.68 |
| viscosity (centipoises) | 340 | 360 | 400 | 420 |

| | Sample | | | |
|---|---|---|---|---|
| | 8.9 Sample 3 | 8.10 Sample 3 | 8.11 Sample 3 | 8.12 Sample 3 |
| Latex. | 104.7 | 104.7 | 104.7 | 104.7 |
| Butyl CARBITOL ® | 6.24 | 6.24 | 6.24 | 6.24 |
| PROPASOL ® B | 3.12 | 3.12 | 3.12 | 3.12 |
| Silica (SYLOID TS-100) | — | 0.31 | 0.94 | 1.56 |
| NH4OH(14%) | 0.55 | 0.49 | 0.47 | 0.57 |
| pH | 8.21 | 8.20 | 8.19 | 8.22 |
| water | — | 0.97 | 2.95 | 5.10 |

Films of Samples 8.1–8.12 were cast on black vinyl test panels to give a dry film thickness of approximately 25 microns and air-dried under ambient conditions for one week. The film gloss was measured as 60° gloss using a Byk Labotron Gloss Unit. The film clarity was measured using a COLORGARD ® System/OS instrument(Pacific Scientific) by measuring white haze(L* value) and blue haze(b* value).

TABLE 8.2

Film Gloss and Clarity Results for Example 8

| Sample | 60° Gloss | L* value | b* value |
|---|---|---|---|
| 8.1 | 90 | 0.54 | −0.31 |
| 8.2 | 83 | 1.12 | −0.49 |
| 8.3 | 63 | 3.07 | −0.56 |
| 8.4 | 52 | 4.69 | −0.70 |
| 8.5 | 90 | 0.60 | −0.25 |
| 8.6 | 75 | 1.54 | −0.33 |
| 8.7 | 57 | 5.05 | −0.79 |
| 8.8 | 46 | 8.77 | −1.12 |
| 8.9 | 87 | 0.88 | −0.34 |
| 8.10 | 75 | 0.99 | −0.47 |
| 8.11 | 58 | 1.87 | −0.61 |
| 8.12 | 43 | 5.92 | −0.93 |

The treatments of this invention (Samples 8.1–8.4) exhibit film clarity superior to that of Comparative B (Samples 8.5–8.8) as indicated by L* (white haze) and b* (blue haze) values (lower numbers, regardless of sign, indicate lower haze), when compared at equal gloss values, particularly at lower gloss values where the haze is more noticeable. The superior clarity of flatted (lower gloss) films of this invention is essential for lowered gloss coatings on plastics ("wet look") or wood (optimal grain appearance).

EXAMPLE 9

Preparation of clear wood coatings

The following clear wood coatings were prepared by adding the tabulated ingredients in the order listed, with stirring.

TABLE 9.1

Preparation of coatings for Example 9.

| | Sample | |
|---|---|---|
| | 9.1 Sample 2 | 9.2 Comparative C |
| Latex | 83.14 g. | 71.85 g. |
| Defoamer (PATCOTE ® 519) | 0.15 g. | 0.15 g. |
| Butyl CARBITOL ® | 2.91 g. | 2.91 g. |
| Hexyl CELLOSOLVE ® | 4.37 g. | 4.37 g. |
| Aqueous ammonia(14%) | 0.26 g. | 0.23 g. |
| pH | 8.02 | 8.01 |
| water | 3.64 | 9.43 |
| Viscosity (centipoises) | 200 | 360 |

Samples 9.1 and 9.2 were applied to oak panels which had been previously sealed with a commercial nitrocellulose sealer. Treatment was accomplished by applying 2 5-6 mil (wet coating thickness) topcoats using an air-assisted spray gun. After approximately 1 week air-dry under ambient conditions, the 60° Gloss and the Distinctness of Image (DOI) were measured. The 60° Gloss was determined as described in Example 7 and the DOI was determined using a DOI Test Box (Glow Box Model GB 11-8; Instruments for Research & Industry, Cheltenham, Pa.) on a scale of 100(perfect reflected image distinctness) to 10 (extremely poor reflected image distinctness).

TABLE 9.2

Results of Measurements of Example 9

| | Sample | |
|---|---|---|
| | 9.1 | 9.2 |
| 60° Gloss | 87 | 70 |
| DOI | 70 | 10 |

The higher gloss and DOI found for the treatment of this invention (Sample 9.1) relative to the comparative treatment are observed to produce coated wood of superior appearance.

EXAMPLE 9

Aluminum Coating

Samples 7.1 and 7.3 were drawn down on smooth, untreated Aluminum panels and air dried for one week to yield dry film thicknesses of 1 mil. The 60° Gloss of each was measured to give a value of 128-129. Each of the films appeared glossy and of excellent clarity.

What is claimed is:

1. A method for treating substrates comprising:
   (a) forming an aqueous treating composition comprising an aqueous dispersion of copolymer particles wherein said particles comprise at least two mutually incompatible copolymers wherein said mutually incompatible copolymers comprise an outer phase copolymer with a glass transition temperature (Tg) lower than about 35° C. and an inner phase copolymer with a Tg higher than about 45° C., and wherein said particles have an average particle size from about 20 to about 70 nanometers; and
   (b) applying said composition onto a substrate.

2. The method of claim 1 wherein said inner phase copolymer has a Tg higher than about 60° C.

3. The method of claim 1 wherein the weight of said outer phase copolymer is from about 20% to about 95% of the total weight of said particle.

4. The method of claim 1 wherein the weight of said outer phase copolymer is from about 30% to about 75% of the total weight of said particle.

5. The method of claim 1 wherein said substrate is a porous substrate selected from the group consisting of cellulosic substrates and cementitious substrates.

6. The method of claim 1 wherein said substrate is wood.

* * * * *